March 4, 1947.	H. W. SCHAEFER	2,416,849
ELECTRIC INDICATING AND TOTALIZING APPARATUS
Filed Jan. 28, 1942
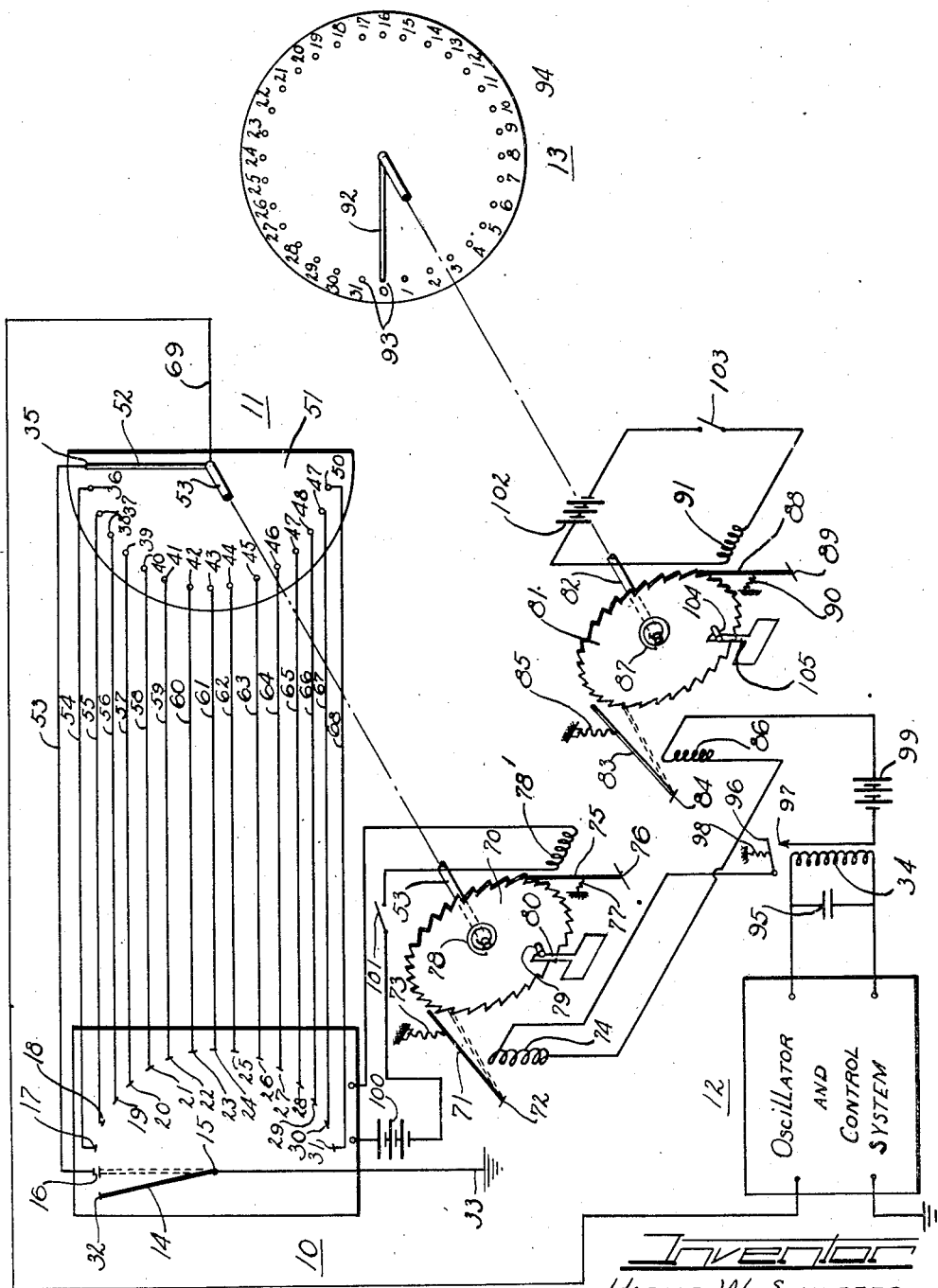
Inventor
HAROLD W. SCHAEFER

UNITED STATES PATENT OFFICE 2,416,849

ELECTRIC INDICATING AND TOTALIZING APPARATUS

Harold W. Schaefer, Chicago, Ill., assignor to The Harry Alter Company, Chicago, Ill., a corporation of Illinois Application January 28, 1942, Serial No. 428,536

3 Claims. (Cl. 177—351)

This invention relates to an indicator, and more particularly to an indicator which registers the intensity of a detected condition or event as well as the cumulative intensity recordings of a series of conditions or events.

One of the features of the present invention is to provide a telemetric system which includes an indicator, a recorder and means for operating the indicator in response to registrations of the recorder including a control circuit which operates the indicator in response to a change in value of certain capacity reactance means therein.

It is a further feature of the present invention to provide such a system which is stable and which eliminates any accidental operation of the indicator due to unintentional or undesired change in the capacity reactance value of the control circuit, such as might be caused by vibration of the instrument or portions thereof.

It is an object of the present invention to provide a telemetric system or indicator having the above characteristics.

It is a further object of the present invention to provide a novel system for operating an indicator from a recording instrument which includes a circuit having capacity reactance means which when changed in value causes operation of the indicator.

Another object of the present invention is to provide a novel indicator which registers the intensity of a detected condition or event as well as the cumulative intensity readings of a series of conditions or events.

Another and further object of the present invention is to provide a control circuit in which a group of capacity reactance means are successively inserted in an electrical control circuit and in which immediately after being placed in the control circuit are promptly disconnected therefrom.

Another and still further object of the present invention is to provide a recorder and indicating instrument having a novel ratchet drive.

The novel features which I believe to be characteristic of my invention are set forth with particularity in the appended claims. My invention itself, however, both as to its organization and manner of construction, together with further objects and advantages thereof, may best be understood by reference to the accompany drawing, in which the single figure thereof is a diagrammatic illustration and wiring diagram of one embodiment of the present invention.

The recorder and indicator shown in the drawing includes in general a recording instrument or meter 10, such as the meter 30 which is illustrated in my prior filed application Serial No. 427,353, filed January 19, 1942, now Patent No. 2,398,046, a synchronous relay 11, an oscillator and control system 12, and an adding relay or indicator 13. The meter or recorder 10 has been diagrammatically illustrated and it is immaterial to a clear understanding of the present invention as to what the exact construction of this instrument or meter is, it being simply understood that the meter responds to a condition or event or a series of conditions or events which are to be recorded and indicated. The meter 10 includes a movable meter arm 14 which is mounted for movement about a point 15. Arcuately arranged around the path of movement of the end of the arm 14 are a series of conducting elements 16 to 31, inclusive. These elements 16 to 31 are so spaced with respect to the path of movement of the end 32 of the arm 14 that each element forms with the end 32 a condenser of predetermined capacity reactance value when the end 32 lies immediately opposite such element. In other words, as the arm 14 moves from its full line position to its dotted line position as shown in the figure, the conducting element 16 and the end 32 of the arm 14 form a condenser of predetermined capacity reactance value. As the arm 14 continues to move to a point opposite the conducting element 17 the element 17 and the end 32 of the arm 14 form a second condenser of substantially the same capacity reactance value as the first condenser, etc. The capacity reactance formed by the elements 16 to 31 with the end 32 of the arm 14 are arranged to be successively inserted in the input circuit of an oscillator and control system through a grounded conductor 33 which is connected to the arm 14 and through the synchronous relay 11. It is to be understood that the insertion of capacity reactance formed by any one of the elements 16 to 31 and the end 32 of the arm 14 causes current to flow in the output circuit of the oscillator and control system 12 which includes the relay coil 34.

The synchronous relay 11 includes a plurality of contacts 35 to 50 which are arcuately arranged on a panel 51 and which are arranged to be engaged by a movable contact element or arm 52 which is mounted on a shaft 53 for rotation thereby. The conducting elements 16 to 31 of the meter 10 are electrically connected to the contacts 35 to 50, respectively, through conductors 53 to 68, respectively. The movable arm 52 is connected to the oscillator and control system 12 through a conductor 69.

A ratchet wheel 70 is also mounted on shaft 53 and is arranged to be driven by a pawl 71 which is mounted for movement about a point 72. The pawl 71 is biased by a suitable biasing spring 73 out of engagement with the teeth of the ratchet wheel 70, but is arranged to be moved into engagement with one of the teeth by a pawl actuating coil 74 whenever the coil 74 is energized for the purpose of advancing the ratchet wheel one tooth in a counter-clockwise direction as viewed in the drawing.

A second pawl 75 which is mounted for movement about a point 76 and which is normally biased into engagement with a tooth on the ratchet wheel 70 by a biasing spring 77 retains the ratchet wheel 70 in its advanced position against the action of a biasing spring 78 which normally tends to rotate the ratchet wheel 70 in a clockwise direction.

A reset coil 78' is associated with the pawl 75 and when energized is arranged to pull the pawl 75 out of engagement with the teeth of the ratchet wheel 70 to permit the ratchet wheel 70 to be returned to its zero position by the spring 78. The ratchet wheel 70 is provided with a pin 79 which is arranged to engage an abutment member 80 to define the zero position of the ratchet wheel 70.

A second ratchet driving mechanism is also provided which is mechanically independent of the ratchet driving mechanism just described. More particularly, the second ratchet driving mechanism includes a ratchet wheel 81 which is mounted on a shaft 82. The ratchet wheel 81 is arranged to be driven by a pawl 83 which is mounted for movement about a point 84, the pawl 83 being normally held out of engagement with the teeth of the ratchet wheel 81 by a biasing spring 85. The pawl 83 is arranged to be moved into engagement with the teeth of the ratchet wheel 81 and to advance the ratchet wheel 81 one tooth in a counter-clockwise direction by an actuating coil 86 whenever the actuating coil 86 is energized. The ratchet wheel 81 is biased for movement in a clockwise direction by a spring 87. Also associated with the ratchet wheel 81 is a second pawl 88 which is mounted for movement about a point 89 and which is normally urged toward the teeth of the ratchet wheel 81 by a biasing spring 90. The pawl 88 is moved out of engagement with the teeth of the ratchet wheel 81 by an actuating coil 91 whenever the coil 91 is electrically energized.

The ratchet wheel 81 is arranged to move a pointer or arm 92 on the indicator 13. More particularly, the pointer or arm 92 on the indicator 13 is mounted on the same shaft 82 as is the ratchet wheel 81. The arm 92 is arranged to be advanced through a series of indicating positions represented by the small circles 93 which are located on a panel 94 of the indicator 13. As will readily be understood from an inspection of the drawing, the arm 92 is arranged to move through 360° and cover a greater number of indicating positions than the maximum number of indicating positions covered by the meter 10. As will presently be more fully understood, the indicator 13 is arranged to indicate the cumulative result of a series of recordings made by the meter 10.

Let us now turn back to a consideration of the electrical circuit and the manner in which the two ratchet mechanisms are driven. As has previously been stated, the oscillator and control system 12 is so designed and arranged that when capacity reactance of the value obtained by any one of the conducting elements 16 to 31 and the end 32 of the meter arm 14 is inserted in the oscillator and control system circuit, current flows in the output circuit thereof. When the arm 14 of the meter 10 is moved from its full line position to its dotted line position in the drawing, a condenser is formed by the conducting element 16 and the end 32 of the arm 14. This condenser or capacity reactance means is inserted in the oscillator circuit through the grounded conductor 33 and through conductor 53, synchronous relay arm 52, conductor 69 to the oscillator and control system. Current is caused to flow in the output circuit of the oscillator and control system through the relay coil 34. A condenser 95 is preferably connected across the coil 34 to prevent chattering of the relay due to the alternating current output of the oscillator. Associated with the relay coil 34 is a movable contact 96 and a stationary contact 97. The movable contact 96 is normally biased to its open position by a biasing spring 98. The switch 96, 97 is connected in series with the actuating coil 74, the actuating coil 86, and a source of electric energy 99, such for example as a battery. When the relay coil 34 is energized by the oscillator and control system, the switch element 96 closes against the stationary contact 97 and causes energization of the actuating coils 74 and 86, which in turn cause their associated pawls 71 and 83 to advance the ratchet wheels 70 and 81 one tooth each. Advancement of the ratchet wheel 81 causes the pointer 92 to advance to the next small circle 93 to indicate that the pointer or movable arm 14 on the meter 10 has advanced to the position as shown by the dotted line in the drawing. The advancement of the ratchet wheel 70 causes the contact arm 52 to leave the stationary contact 35 and move to the next stationary contact 36. This takes the capacity reactance out of the oscillator and control system circuit which has just been inserted by movement of the arm 14 to a point opposite the conducting element 16 and thus any fluttering of the arm 14 will not cause any additional surge of current in the output circuit of the oscillator.

If the meter arm 14 continues to move until it comes to a position opposite the conducting element 17, capacity reactance is again inserted in the oscillator and control system circuit and again a surge of current occurs in the output circuit of the oscillator to cause a closing of the movable relay contact 96 against the stationary contact 97. This in turn causes energization of the actuating coils 74 and 86 and a further advancement of one tooth of each of the ratchet wheels 70 and 81. Movement of the ratchet wheel 70 thus causes the movable contact arm 52 to advance to the next stationary contact, namely contact 37, which is connected to the next succeeding electrical conducting element 18. It will thus be seen that except for the short interval when capacity reactance is first inserted in the oscillator circuit, the movable contact arm 52 always remains one step ahead of the meter arm 14.

A circuit for resetting the meter 10 and the synchronous relay 11 is provided which includes a source of electric energy 100 and a switch 101. The battery 100 and the switch 101 are connected in the circuit of the reset coil 78', as well as in the meter circuit, and it will be understood that when the switch 101 is closed after the meter arm 14 has returned to its zero position, the actuating or reset coil 78 associated with the ratchet wheel 70 is energized, thus causing the pawl 75 to move out of engagement with the teeth of the ratchet wheel 70 and to permit the latter to return to its zero position with the pin 79 against the abutment or stop element 80. A separate reset circuit is provided for the ratchet wheel 81 and includes a source of electric energy 102, such for example as a battery, and reset switch 103. When the switch 103 is closed the actuating coil 91 is energized to pull the pawl 88 out of engagement with the teeth of the ratchet wheel 81, thus permitting the ratchet wheel 81 to return to its zero position. A pin 104 is provided on the ratchet wheel 81 and an abutment 105 is associated therewith to limit the clockwise movement of the ratchet wheel 81 by the biasing spring 87 when the pawl 88 is freed from the teeth. The relative position of the pin 104 and the abutment 105 of course determine the zero position of the indicator 13.

By virtue of the fact that the energization of the reset coil 91 is separate from the energizing circuit of the reset coil 78', it will be observed that the indicator 13 can record the cumulative result of a series of recordings made by the meter 10. Thus, for example, if the meter arm 14 advances to a position opposite conducting element 25, the indicating arm or pointer 92 on the indicator 13 will have advanced ten positions as defined by the circles 93, and the movable contact arm 52 will have advanced ten positions to a point where it is in engagement with the contact 45 associated with the conducting element 26. Let us then assume that the switch 101 is closed causing the contact arm 52 to return to its position in engagement with the stationary contact 35. Let us assume further that there is then a second reading on the meter 10 which causes the movable meter arm 14 to advance to a position opposite the electric conducting element 22. This will advance the pointer 92 on the indicator seven more indicating positions, or, in other words, to a point seventeen positions, as represented by the circles 93, beyond its zero position. When the movable meter arm 14 advances to the position opposite conducting element 22, the movable contact arm advances to a position where it is in engagement with the contact 42 which is associated with conducting element 23.

If it is now desired to remove the cumulative total reading on the indicator 13, and to place the system in a condition where the indicator will assume its zero position, both switches 101 and 103 are closed. This causes a zeroing of the meter, the synchronous relay and the indicator.

For purposes of clarity only a limited number of conducting elements have been shown on the meter 10, and a limited number of indicating positions shown on the indicator 13. It is, of course, to be understood that a much larger number may be employed on either the meter or the indicator or both, it being simply remembered that the synchronous relay shall have as many stationary contacts as there are conducting elements on the meter, and that each conducting element on the meter must be connected to one of such stationary contacts.

While I have shown a particular embodiment of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. The combination comprising a plurality of spaced condenser plates, a device having a first movable conductive element reciprocable past said condenser plates and in spaced relation thereto and adapted to form with each of said plates, one at a time, a complete condenser, a second movable conductor element normally movable in one direction only to successively make contact with said condenser plates, one at a time, for the energization of said plates, one at a time, a source of current in circuit connection with said second movable element, means normally urging said second movable element in an opposite direction of movement, means normally resisting movement of said second movable element in the opposite direction of movement, means including said first movable element and said second movable element and said condenser plates to effect movement of said second movable element in said one direction in response to movement of said first movable element in only one direction of movement thereof, and means operable at will to release said second movable element for urged movement in the opposite direction of movement.

2. The combination comprising a plurality of spaced condenser plates, a reciprocable condenser element reciprocable past said plates to form with each of said plates, one at a time, a complete condenser, a movable conductor element normally movable in one direction only to successively make contact, one at a time, with said condenser plates, a source of current in circuit connection with said movable element, means normally restraining said movable element against movement in the opposite direction of movement, an indicator arm normally movable in one direction only, means normally restraining said movable arm against movement in the opposite direction of movement, and means to simultaneously move said movable element and said movable arm in said one direction only in response to movement of said reciprocable condenser element in only one direction of movement thereof.

3. The combination comprising a counter, an electric driving means therefor, a control circuit for intermittently energizing said driving means and operable by insertion of capacity reactance of predetermined value in the control circuit, means responsive to each event to be counted for intermittently inserting capacity reactance of said predetermined value in said control circuit including a synchronous relay having a single movable contact and a plurality of stationary contacts, the capacity reactance being formed by and inserted in the control circuit successively through one of the stationary contacts and the movable contact of said relay.

4. Indicating apparatus comprising a registering member having means movable in response to a condition to be registered, a plurality of fixed condenser elements, said means including a complementary condenser element arranged to be successively positioned opposite said fixed condenser elements as said means is moved in response to the condition to be registered and successively forming with each fixed element a condenser having capacity reactance of predetermined value, means for advancing said indicating means step by step, a synchronous relay having a plurality of stationary contacts corresponding in number to the number of fixed condenser elements and a movable contact element, means for advancing said movable relay contact step by step from electrical engagement with one stationary relay contact to the next, and a control circuit for controlling the operation of both of said advancing means, said stationary relay contacts being electrically connected to said fixed condenser elements respectively, said control circuit being successively connected to said fixed condenser elements through said movable relay contact and being arranged to cause operation of both of said advancing means whenever capacity reactance is inserted in said control circuit by any one of said fixed condenser elements and said condenser element of said movable means.

5. The combination comprising a movable meter element at least a portion of which is formed of conducting material, a plurality of conducting elements positioned in proximity to the path of movement of said meter element and successively forming with the conducting portion thereof capacity reactance of predetermined value, a synchronous relay and a synchronous counter, driving means for said relay and mechanically separate driving means for said counter, an electric control circuit in which said capacity reactances are arranged to be inserted for jointly controlling the operation of both of said driving means, said control circuit being rendered operative to effect step by step advancement of said driving means each time one of said capacity reactances is inserted therein, said conducting elements being connected to said control circuit through said synchronous relay, said synchronous relay being arranged to disconnect a conducting element from said control circuit immediately after capacity reactance is inserted in the control circuit by the positioning of the movable meter element opposite that particular conducting element and to advance said synchronous relay to position the next succeeding conducting element in the control circuit.

6. The combination comprising means for registering the intensity of an occurrence, including a movable conducting element and a series of stationary conducting elements positioned in proximity to the path of movement of said movable element, said movable element being movable in response to an occurrence a distance along said path of movement which is a function of the intensity of the occurrence, an indicator for designating the intensity of the occurrence registered, driving means for advancing said indicator step by step for each stationary conducting element passed by said movable element, each of said stationary conducting elements forming a condenser of predetermined capacity reactance value when said movable conducting element is positioned opposite thereto along its path of movement, electric circuit means controlling the operation of said driving means, said electric circuit means being rendered operative to effect operation of said driving means to advance said indicator one step whenever capacity reactance of said predetermined value is inserted in said electric circuit means, a relay having a movable contact and a plurality of stationary contacts corresponding in number to the number of stationary conducting elements, one of said stationary contacts being connected to each of said stationary conducting elements respectively, driving means for advancing said movable relay contact from one stationary contact to the next, said electric circuit means also controlling the operation of said relay driving means, the movable relay contact and the movable conducting element being connected in said electric circuit means, whereby capacity reactance of said predetermined value is inserted in said electric circuit means for each stationary conducting element opposite which said movable conducting element passes and whereby said movable relay contact continues one step ahead of said movable conducting element except when said movable conducting element first moves into a position opposite the stationary conducting element associated at that moment with the movable relay contact.

7. The combination comprising a movable meter element, at least a portion of which is formed of conducting material, a plurality of conducting elements positioned in proximity to the path of movement of said meter element and successively forming with the conducting portion thereof capacity reactance of predetermined value, a synchronous relay and a synchronous counter, a pawl and ratchet drive for said relay and a mechanically separate pawl and ratchet drive for said counter, electrically operated means for moving the pawl of said relay ratchet one step and a second electrically operated means for moving the pawl of said counter ratchet, said electrically operated means for both pawls being connected in a common electrical circuit, control means for effecting energization and de-energization of said electrical pawl operating means, said control circuit being rendered operative to effect energization and de-energization of said electric pawl operating means each time one of said capacity reactances is inserted in said control circuit, said conducting element being connected to said control circuit through said synchronous relay, said synchronous relay being arranged to disconnect the conducting element from said control circuit immediately after capacity reactance is inserted in the control circuit by the positioning of the movable meter element opposite that particular conducting element and to advance such synchronous relay to position the next succeeding conducting element in the control circuit.

8. The combination comprising means for registering the intensity of an occurrence, including a movable conducting element and a series of stationary conducting elements positioned in proximity to the path of movement of said movable element, said movable element being movable in response to an occurrence a distance along said path of movement which is a function of the intensity of the occurrence, an indicator for designating the intensity of the occurrence registered, driving means for advancing said indicator step by step for each stationary conducting element passed by said movable element, each of said stationary conducting elements forming a condenser of predetermined capacity reactance value when said movable conducting element is positioned opposite thereto along its path of movement, electric circuit means controlling the operation of said driving means, said electric circuit means being rendered operative to effect operation of said driving means to advance said indicator one step whenever such capacity reactance of said predetermined value is inserted in said electric circuit means, a relay having a movable contact and a plurality of stationary contacts arranged to be successively engaged thereby and corresponding in number to the number of stationary conducting elements, one of said stationary contacts being connected to each of said stationary conducting elements respectively, driving means for advancing said movable relay contact from one stationary contact to the next, said electric circuit means also controlling the operation of said relay driving means, the movable relay contact and the movable conducting element being connected in said electric circuit means, whereby capacity reactance of said predetermined value is inserted in said electric circuit means for each stationary conducting element opposite which said movable conducting element passes and whereby said movable relay contact continues one step ahead of said movable conducting element except when said movable conducting element first moves into a position opposite the stationary conducting element associated at that moment with the movable relay contact, means for simultaneously zeroing the meter and moving said movable relay contact back into engagement with the first of the series of stationary contacts, and separate means for zeroing said counter, whereby said counter may record and indicate the cumulative total of a series of intensity registrations by said movable conducting element.

HAROLD W. SCHAEFER.

REFERENCES CITED

The following references are of record in the file of this patent:

UNITED STATES PATENTS

| Number | Name | Date |
|---|---|---|
| 2,192,421 | Wallace | Mar. 5, 1940 |
| 2,398,046 | Schaefer | Apr. 9, 1946 |

FOREIGN PATENTS

| Number | Country | Date |
|---|---|---|
| 396,182 | British | Aug. 3, 1933 |
| 366,223 | German | Jan. 5, 1923 |